April 28, 1953  M. L. MOYER  2,636,475
POULTRY FEEDER
Filed May 12, 1949 4 Sheets-Sheet 2
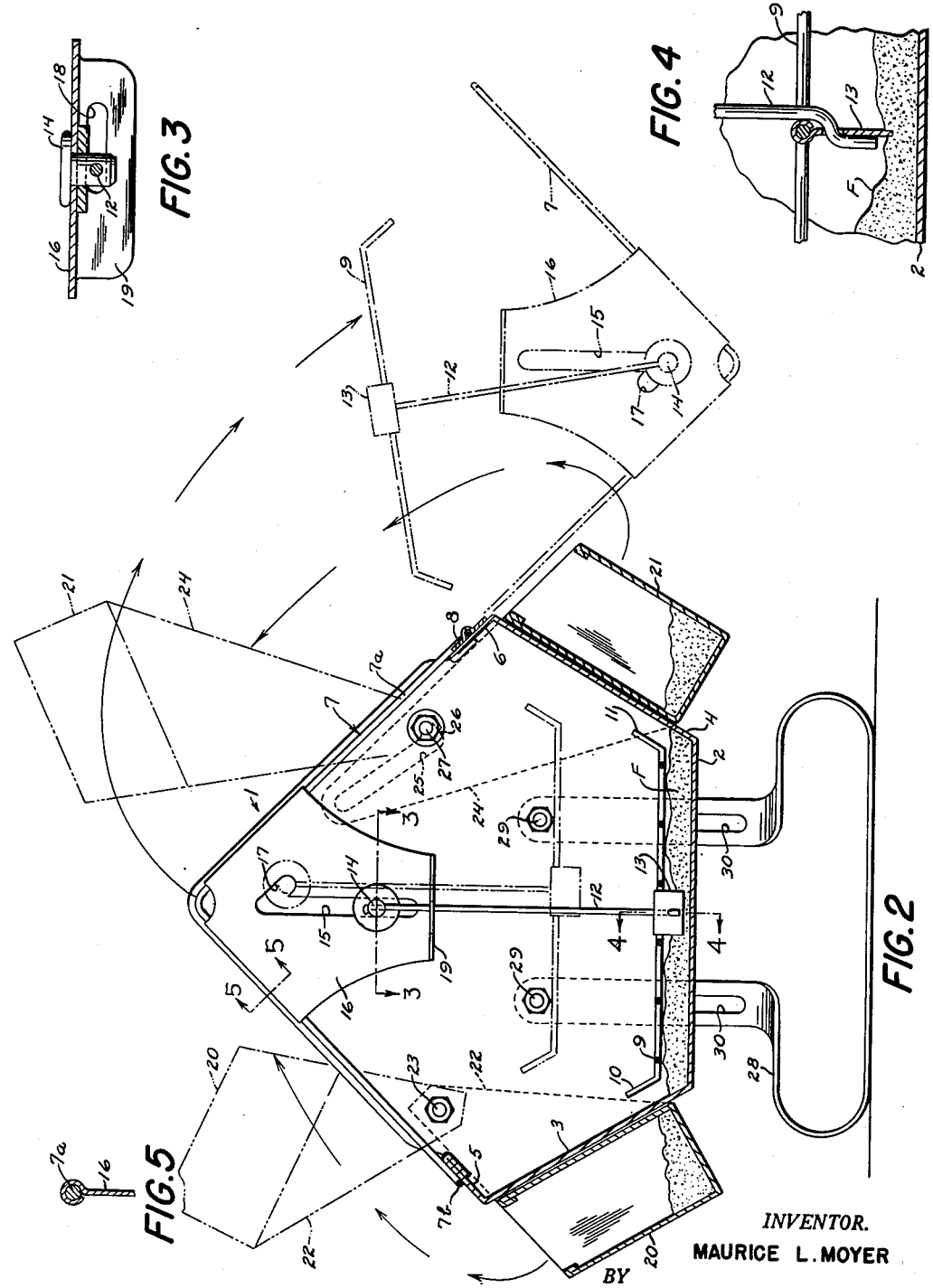
INVENTOR.
MAURICE L. MOYER
BY Oldham & Oldham
ATTORNEYS April 28, 1953

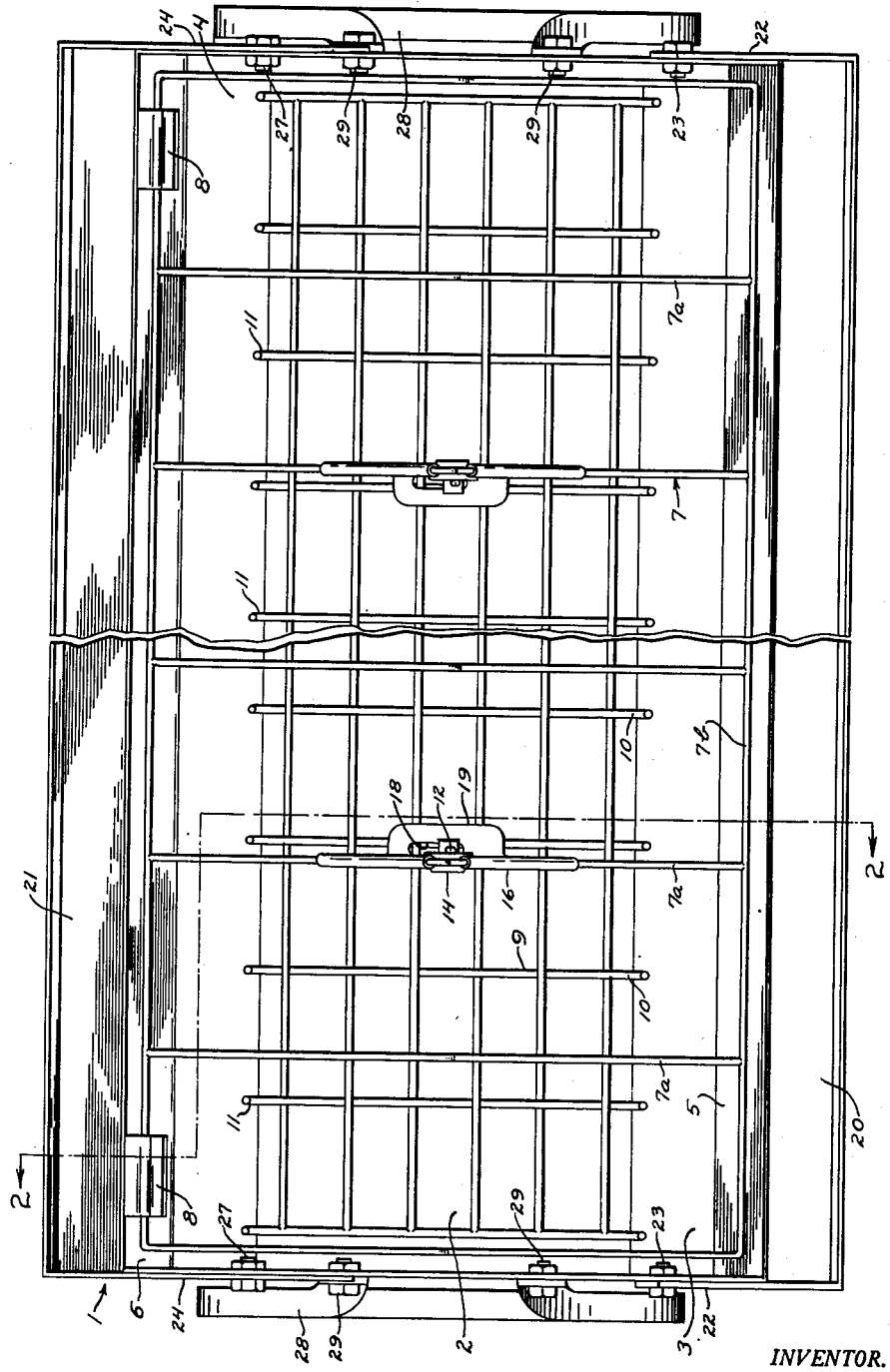

M. L. MOYER 2,636,475

POULTRY FEEDER

Filed May 12, 1949

*INVENTOR.*
MAURICE L. MOYER

BY

*Oldham & Oldham*

ATTORNEYS

April 28, 1953

M. L. MOYER
POULTRY FEEDER 2,636,475

Filed May 12, 1949

INVENTOR.
MAURICE L. MOYER

BY Oldham & Oldham
ATTORNEYS

Patented Apr. 28, 1953

2,636,475

UNITED STATES PATENT OFFICE 2,636,475

POULTRY FEEDER

Maurice L. Moyer, Akron, Ohio

Application May 12, 1949, Serial No. 92,837

7 Claims. (Cl. 119—61)

This invention relates to poultry feeders, especially to a poultry feeder that is adapted to provide an efficient feeding action by a relatively uncomplicated mechanism which can be readily refilled.

It has been proposed heretofore to use a piece of hardware cloth (wire mesh) over feed in a conventional chicken feeder to prevent the chickens from scattering and wasting feed. However, the ordinary chicken attendant does not or will not take the time to remove the cloth before adding feed and the cloth is soon at the bottom of the feeder, where it does no good.

The general object of the present invention is to provide a new and improved poultry feeder which is characterized by the efficiency of utilization of the feed, and by the ease of filling same with feed and the automatic positioning of the apparatus in its best operating condition.

Another object of the invention is to provide a novel poultry feeder device which is of inexpensive construction and which has auxiliary feed-collecting troughs associated with a main trough and adapted to be dumped therein.

Another object of the invention is to secure a feed retainer device in a poultry feeder in such a manner that the feed retainer does not interfere with movement of the cover device provided for the feeder and automatically moves out of the trough when the cover is raised.

A further object of the invention is to provide a poultry-feeding trough with a feed retainer device that floats on feed in the trough but still is removed from the trough when same has its cover removed.

Further objects of the invention are to provide an effective poultry feeder trough which can be easily opened up for cleaning same or for inserting more feed therein; to provide a novel type of a hanger arm for supporting and guiding a feed retainer device in a feed trough; to provide a feed trough which has a wire type cover member provided by which a feed retainer device is carried; to provide a feed retainer device that will be supported upon the feed in a feed trough and which can be readily repositioned on the top of fresh feed added to the trough; and to provide a hanger arrangement for a feed retainer device which will not permit the device to move to the bottom of the feed trough.

The foregoing and other objects and advantages of the invention will be made more apparent as the specification proceeds.

Attention is now directed to the accompanying drawings wherein there is shown, for a better understanding of the invention, one embodiment of the apparatus incorporating the principles of the invention and wherein:

Fig. 1 is a plan, partially broken away, illustrating a poultry feeder device of the invention;

Fig. 2 is a vertical cross sectional elevation taken on line 2—2 of Fig. 1 with the cover being indicated in its open position;

Fig. 3 is an enlarged section taken on line 3—3 of Fig. 2;

Fig. 4 is an enlarged section taken on line 4—4 of Fig. 2 to show how a hanger arm is secured to a feed retainer device and how the device is kept off the trough bottom;

Fig. 5 is an enlarged section taken on line 5—5 of Fig. 2 to show the manner in which a support plate is secured to a cover portion of the invention;

Figure 6:
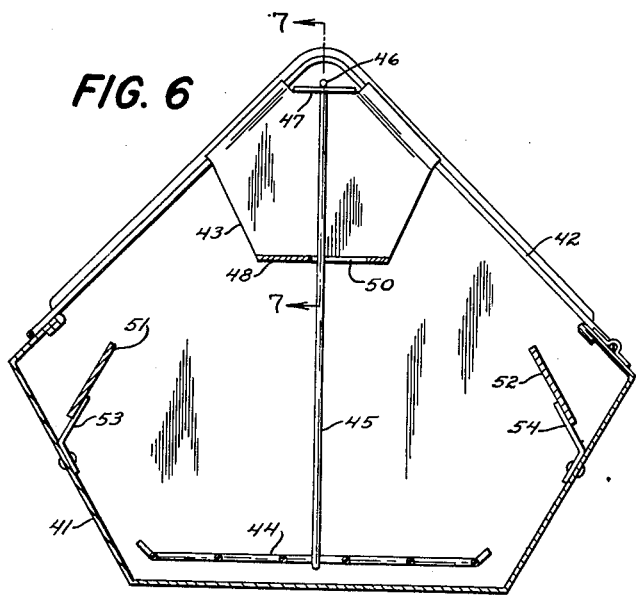
Fig. 6 is a cross sectional elevation of a modified structure embodying the principles of the invention.

The present invention, broadly speaking, relates to a poultry feed trough wherein a main trough is provided that has upstanding side portions which support a wire cover thereon which is pivotally carried thereby along one edge of the trough for swinging movement to remove the cover from association with the trough. Auxiliary feed-collecting troughs are provided immediately adjacent the side edges of the trough and below same are pivotally carried by the main trough for movement over and around the edges of the trough whereby the auxiliary troughs can be dumped into the main trough and a feed-retainer device is provided on the interior of the trough. Means are provided for securing the feed retainer device to the cover whereby such retainer device will be automatically raised out of the trough upon pivotal movement of the cover but also will float upon feed contained in the trough.

For a better understanding of the invention, attention is directed to the details of the structure shown in the drawings wherein the numeral 1 indicates broadly the novel feed retainer trough of the invention. This trough 1 actually comprises a substantially rectangularly shaped main feed receiving trough 2 which is formed from any suitable material, such as sheet metal, and which has a pair of outwardly and upwardly extending side portions 3 and 4 that terminate in inwardly and upwardly extending upper edges 5 and 6, respectively. As indicated in Fig. 2, the metal sheet used in forming the trough 1 may be folded back upon itself at the edges 5 and 6 to reinforce same and to avoid presenting a sharp edge at this portion of the feed trough.

In order to prevent chickens or other fowl from actually getting into the trough 2, an open type of a cover 7 is pivotally secured to the trough 2 at the upper edge thereof. Fig. 2 shows that the cover is of inverted V shape in transverse section. Thus suitable hinges, or anchor plates 8 are shown secured to the upper edge 6 of the trough 2 and these hinges engage with one edge of the cover 7 whereby the cover is free for pivotal movement about that side margin thereof whereas the other side margin of the cover 7 is merely supported upon the upper edge 5 of the trough 2. Usually the cover 7 is formed from wire means which may be welded or woven together in any conventional manner and usually has transversely extending openings or mesh provided therein whereby a chicken or the like can insert its head between parallel wires forming the cover 7 and reach down into the trough to take food therefrom. The cover is shown formed from a plurality of transversely extending wires 7a that are secured together by edge wires 7b.

A quantity of feed F is shown positioned in the main trough 2 and this feed naturally will be of varying vertical depth in the trough with use of same. Feed is retained in the trough 2 by means of a feed retainer device 9. Usually this feed retainer merely comprises a hardware cloth sheet which is provided with suitable size, usually rectangular, mesh openings therein to permit a fowl to pick up feed positioned thereunder but which will effectively prevent the fowl from scattering the feed excessively by his feeding action. Fig. 2 of the drawings shows that side edge portions 10 and 11 of the feed retainer 9 extend upwardly and outwardly with relation to the remainder thereof. This construction aids in preventing the feed retainer from becoming wedged in the bottom of the trough 2 and also aids in positioning or picking up same manually, when desired. The feed retainer 9 is positioned in the trough 2 by means of one or more hanger or support arms 12. These support arms 12 are usually formed from metal wire and are engaged with the feed retainer 9 in any conventional manner. In this instance, there is shown a plate 13 which is suitably engaged with the feed retainer 9 and extends downwardly therefrom a short distance. The support arm 12 is welded, brazed, soldered or otherwise engaged with this plate 13 to secure the support and the feed retainer together although this same connection may be formed in any conventional manner.

One special feature of using the plate 13, best shown in Fig. 4, is that the plates 13 aid in retaining the feed retainer device 9 in a raised or elevated position with regards to the bottom portion of the trough 2 at all times regardless of whether there is any feed in same or not. The support arms 12 extend vertically of the trough 1 and are suitably engaged at their upper ends with a headed pin or rivet 14. This rivet 14 in turn is engaged with a slot 15 which is formed in a support plate 16 that is suitably secured to portions of the cover 7 and extends downwardly therefrom. Fig. 2 of the drawings indicates that slot 15 extends vertically for the major portion of its length but that an offset locking extension 17 or locking seat may be provided in the slot 15 at the upper end thereof whereby the rivets 14 can be slid vertically upwardly in the slot 15 and then be pushed over into the extension 17 for locking or retaining the support arms 12, and hence the feed retainer 9, in an elevated position.

Since the cover 7 carries the support arms 12 and support plates 16, obviously the feed retainer 9 will move with the cover when it is raised. In order to limit movement of the support or hanger arms 12 at such times, preferably such arms extend through slots 18 as indicated in Fig. 3. These slots 18 are formed in axially inwardly extending flanges 19 that are provided on the bottom edges of the support plates 16.

By providing the trough 2 with the sides and upper edges illustrated, it is difficult for poultry to knock or spread feed out of the trough 1. However, at some times feed will be thrown or pushed out of the trough. Such feed has a tendency to merely slide over the upper edges 5 and 6 and a special feature of the present construction permits such displaced feed to be collected. Thus two auxiliary troughs 20 and 21 are provided for the main trough 2 with one of such troughs being positioned adjacent and immediately below the lower edge of each of the upper edges 5 and 6 of the main trough and extending the length thereof. Hence any feed sliding over the edges 5 and 6 will fall down into the auxiliary troughs 20 and 21.

These troughs 20 and 21 may be of any desired shape or contour, but again, preferably, the outer and upper edges of the troughs 20 and 21 are inwardly turned upon themselves to prevent the formation of a sharp edge. It is important that the troughs 20 and 21 be capable of being dumped into the main trough 2 and side or end arms 22 are formed on or secured to the auxiliary trough 20 at the ends thereof and extend over the end portions of the trough 2, being secured thereto in any conventional manner for pivotal movement as by bolts 23. The trough 21 is associated with the upper edge 6 which has one edge of the cover 7 pivotally secured thereto so that the trough 21 is usually provided with side or end arms 24 that are appreciably longer than the end arms 22 of the corresponding trough. Each of these end arms 24 is provided with a relatively elongated slot 25 and with each slot having an offset seating or locking extension 26 provided therein at the lower end thereof and which extend in offset relationship to the remainder of the slot. Conventional means, such as a bolt 27 extends through each of the slots 25 to secure the trough 21 to the main trough 2 for pivotal and upward swinging movement with relation thereto. Normally in its operative position, the trough 21 will have the bolt 27 positioned in the seating offset 26 of the slot 25 whereby the auxiliary trough will be in desired intimate relationship to the upper edge 6. However, when the trough 21 is to be dumped into the trough 2, it is desirable to provide such trough with a greater height or elevation for movement above the trough 2 than is required for the auxiliary trough 20. Thus the bolts 27 are moved into the main portions of the slot 25 whereby the auxiliary trough 21 has appreciably greater movement transversely outwardly and upwardly of the trough than does the other auxiliary trough. The auxiliary trough 21 can be swung up to a position sufficiently high above and inwardly of the trough 2 to insure emptying its contents into the main trough even though the cover 7 is positioned thereon. Usually the auxiliary trough 20 is emptied into the main trough 2 when the cover 7 is swung up to its uppermost position whereby the cover does not interfere with emptying the contents of the trough 20 into the main trough.

Fig. 2 indicates in chain dotted lines the position of the cover and means carried thereby when it is swung to its outermost or exposed condition whereby the trough 2 of the invention can easily be replenished with feed after which the cover will be swung back into its closed position. Inasmuch as the feed retainer 9 is adapted to be supported on the upper surface of feed in the trough of the invention, the support arms 12 will adjust themselves in the retainer slots 15 provided therefor and the feed retainer device then will automatically lower itself in the trough as the level of feed contained therein lowers itself by removal of feed by fowl using this poultry feeder. The movement of the feed retainer 9 out of the way to facilitate putting feed into the trough, and the return of the retainer to retaining position is automatic with the movement of the cover 7 and eliminates buying the feed retainer 9 under the feed.

Usually the trough of the invention has a conventional positioning or frame means provided therefor and in this instance metal strap mounting frames 28 are provided for positioning the main trough 2. These straps 28 are provided at each end of the trough and may be secured thereto by conventional means such as bolts 29 that extend through vertically directed slots 30 formed in vertically extending portions of the straps 28 whereby the vertical relationship between the trough and its mounting means may be varied, dependent upon the desired elevation of same.

Figure 7:
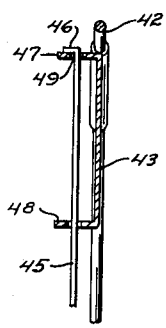
Fig. 7 is a detailed vertical section taken on line 7—7 of Fig. 6.

Figs. 6 and 7 indicate a modification of the invention wherein a simpler type of support means is provided for retaining the feed retainer device in operative association with the cover of the trough. In this instance, a trough 41 is provided that has an open type cover 42 hingedly secured thereto along one edge thereof. The cover 42 carries one or more support plates 43 thereon. A feed retainer 44, similar to the feed retainer 9, is provided for receipt in the trough 41 and it is secured to the support plate 43 by one or more hanger or support arms 45. The hanger arms 45 are provided with turned over or bent upper ends 46 that are engaged with upper flanges 47 provided on the support plates 43 which also has lower flanges 48. A hole 49 and a slot 50 are provided in the upper and lower flanges 47 and 48, respectively, for receipt of a hanger arm 45 to limit or control its position at all times. Thus the feed retainer 44 will move with the cover 42 but can be retained in a substantially vertical position throughout the first or initial movement of the cover 42 and this aids in retaining the feed retainer 44 in desired relation thereto and aids in positioning same in the trough 31 when the cover 42 is returned to its closed position which usually is after feed has been placed into the trough 41, or after the trough has been cleaned.

As a further feature of the construction shown in Fig. 6, auxiliary feed retainer plates 51 and 52 are positioned in the trough 41 in upwardly and inwardly inclined positions by means of longitudinally spaced brackets 53 and 54, respectively. By positioning the feed retaining plates 51 and 52 within the trough 41 adjacent but below the upper edges thereof and extending inwardly therefrom it is difficult for feed to be pushed out of the trough.

Figure 8:
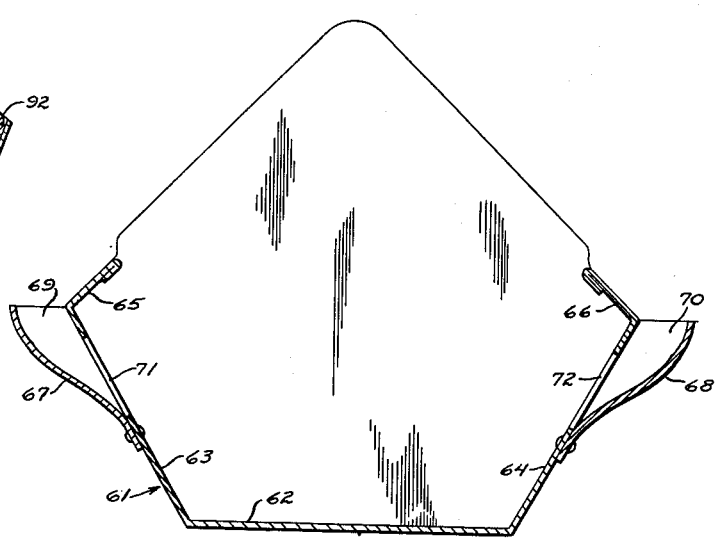
Fig. 8 is a transverse section of still another modification of the present invention.

Another modification of the invention is shown in Fig. 8 and this embodiment of the invention normally is provided with the type of a hanger or support arm as shown in any of the other of the figures of the invention. In Fig. 8, a trough 61 is provided that has a bottom 62 and upwardly and outwardly extending side portions 63 and 64. The upper edges of the sides 63 and 64 are inwardly turned as at 65 and 66. In this embodiment of the invention, means are provided for automatically collecting and returning feed going out over the upper edges 65 and 66 of the feed trough. Such means comprise troughs 67 and 68 that are secured to the outer portions of the sides 63 and 64 immediately adjacent and below the lower edges of the upper portions 65 and 66 of the trough. Usually the troughs 67 and 68 are provided with ends 69 and 70, respectively, that enclose the space between the trough 67 and 68 and the adjacent portions of the sides 63 and 64 at the ends of such auxiliary trough members. The auxiliary troughs 67 usually extend the complete length of the sides 63 and 64 and longitudinally spaced slots 71 and 72 of any desired size can be cut into the sides 63 and 64 immediately adjacent the lower portion of the troughs 67 and 68 for return of feed collected thereby to the main trough 61.

Figure 9:
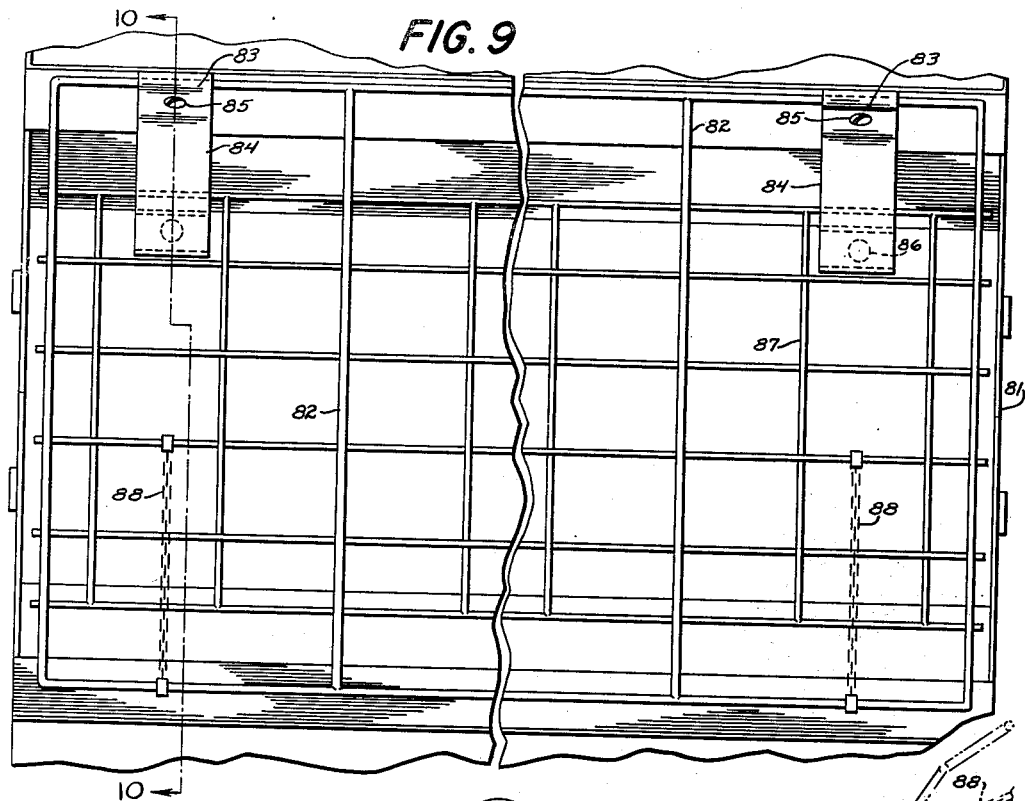
Fig. 9 is a plan, partly broken away, of another modification of the invention wherein a particularly novel type of means for securing the feed retainer device to the cover member is provided.
Figure 10:
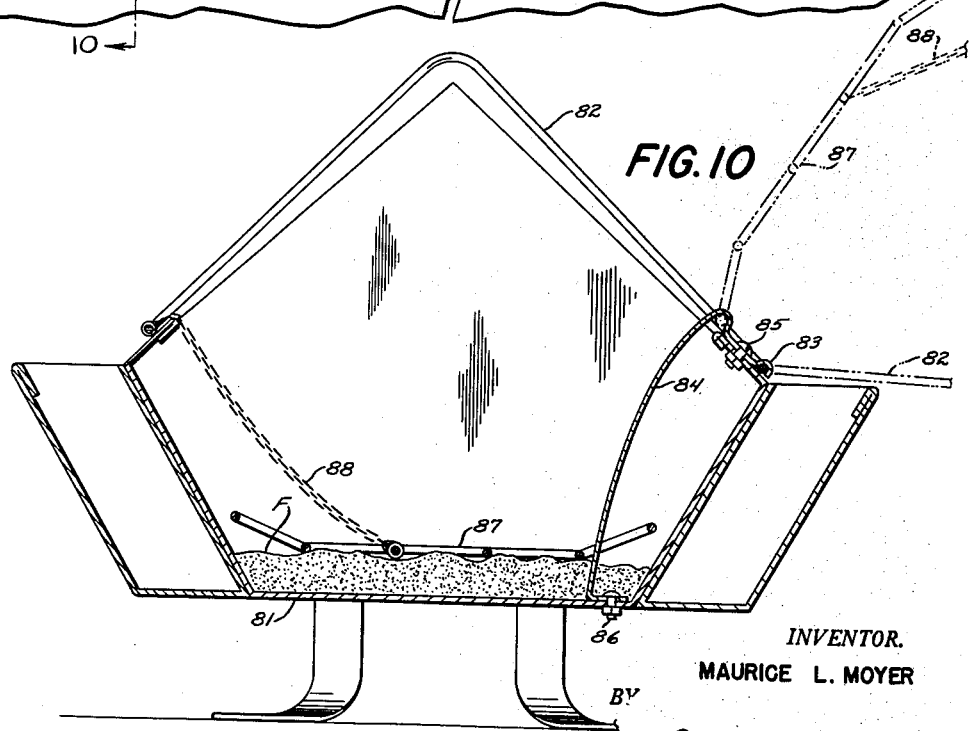
Fig. 10 is a vertical section taken on line 10—10 of Fig. 9.

A further modification of the invention is shown in Figs. 9 and 10 wherein another type of means for securing a feed retainer tray to the cover is provided. In this instance, a trough 81 has any desired kind of an open constructed cover 82 pivotally secured thereto along one edge thereof. In this instance, the cover 82 may be secured in place at one edge of the trough 81 by an arcuate section 83 of a strap 84 that is secured to the trough 81 by a bolt or conventional device 85 at the upper portion of the trough 81 at one end thereof. The strap 84 continues in a flat arc down to a portion of the trough 81 adjacent the base thereof. Such lower end of the strap 84 is secured, as by bolt 86, to the bottom of the trough 81. A plurality of straps 84 may be provided at several longitudinally spaced portions of the trough 81 along one side thereof to provide for pivotal movement of the cover 82 on the trough 81 and for another action described hereinafter.

A feed retainer 87, usually made from hardware cloth, is provided in the trough 81 and the straps 84 are in threaded engagement with the feed retainer 87 whereby the position and movement of the feed retainer device will be limited by the straps 84. To provide for part of this movement of the feed retainer 87 when the cover 82 is raised, one or more flexible members, such as chains 88 are secured between the free edge of the cover 82 and a portion of the feed retainer 87, usually one which is spaced inwardly of the feed retainer 87 appreciably from the lateral margin thereof remote from the strap 84 whereby a better balancing action is achieved on the feed retainer 87 when it is raised by means of the chain 88. Of course, the feed retainer 87 will be supported upon any feed in the trough 81 and will automatically adjust itself vertically of the trough with diminishing amounts of feed in the trough. The modification of the invention shown in Figs. 9 and 10 may be provided with any desirable type of auxiliary troughs associated therewith, as disclosed herein, for use in returning feed that is thrown, or pushed out of the trough 81 over the upper edges of the sides of the trough.

The troughs of the invention, as indicated, may be made from any conventional material in any desired manner so that usually they are formed from lightweight sheet metal material and the covers are formed from suitable wire whereby a relatively lightweight trough can be provided. It can be finished in any desired manner so as to retard deterioration thereof by the elements or by other exposure to which the troughs are subjected when in use. It will be realized that in all instances, the feed retainers used will be moved automatically with the covers when they are raised to expose the trough for cleaning or addition of feed thereto. The covers may be supported on the troughs in any desired manner. It is normal to swing the cover means away from the troughs when adding feed thereto, since the covers usually are pivotally secured to the troughs. By use of the present invention, no additional labor or operation is required to remove the feed retainer device or tray when feed is being added to the trough and then to replace the feed retainer in proper position in the feed trough when the cover is replaced and the trough is ready for service. Furthermore, the feed retainer will maintain itself on top of feed in the trough and will tend to equalize the amount of feed in different longitudinal portions of the trough. Sometimes it may be desirable to use the auxiliary troughs of the invention with other types of feeders, and the feed retainer positioning means may likewise be used on any desired style of feeder. Hence the present invention provides an inexpensive but effective device by which the objects of the invention are achieved.

Figure 11:
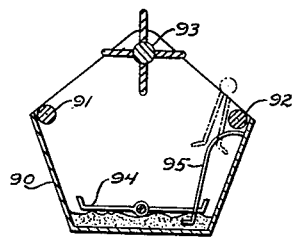
Fig. 11 is a vertical transverse sectional view, on a smaller scale, of a further modification of the invention.

The modification of the invention shown in Fig. 11 is generally similar to the forms heretofore described and includes a trough 90 having rotatable anti-roosting bars 91, 92, and 93 associated with the sides and top thereof. Additionally, a piece of hardware cloth or like feed retainer 94 is associated with the trough and rests on top of the feed. The retainer 94 is associated with the trough and rests on top of the feed. The retainer 94 is longitudinally hinged at its center and is slidably carried at its edge on spaced straps 95, similar to straps 84 of the apparatus of Figs. 9 and 10. Thus, the retainer 94 is readily moved from its full-line feed-retaining position to the folded, dotted-line position so that additional feed can be put in the trough.

Figure 12:
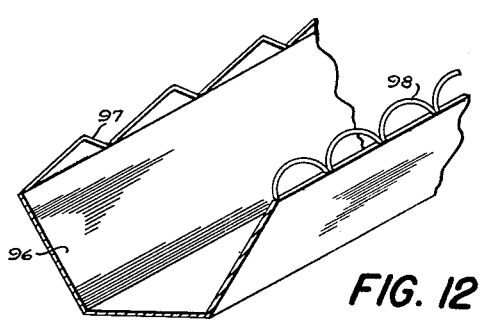
Fig. 12 is a fragmentary perspective view, also on a smaller scale, of another form of the invention.

The form of the invention of Fig. 12 includes a trough 96 having an inwardly turned serrated edge 97 and inwardly turned looped wire edge 98, both or either of which will discourage roosting of chickens on the side of the trough, and which edges can be used with the troughs of the other embodiments of the invention heretofore described.

While several complete embodiments of the invention have been disclosed herein, it will be appreciated that modifications of these particular embodiments of the invention may be resorted to without departing from the scope of the invention as defined by the appended claims.

Having thus described my invention what I claim is:

1. A poultry feeder comprising an elongated trough having outwardly flared side portions terminating in inwardly and upwardly extending upper edge portions, a hardware cloth feed retainer received in said trough, a wire cover having elongate transversely directed openings therein having one edge thereof pivotally secured to one upper edge of said trough and having its other edge adapted to be supported on the other upper edge of said trough, means securing said feed retainer to said cover for movement therewith but also for floating support on feed in said trough when said cover is in its closed position, and an auxiliary feed trough pivotally secured to said trough on the outer surface of each upper edge thereof and normally being positioned against the outer surface of each side wall adjacent the upper edge thereof, said auxiliary troughs each having relatively elongate end support arms provided thereon which engage with said trough and provide pivotal movement of said auxiliary trough up over the upper edges of said trough sides to empty said auxiliary troughs into said trough.

2. A poultry feeder comprising an elongate trough having side portions, an open mesh feed retainer received in said trough, an open type cover having one edge thereof pivotally secured to one side edge of said trough and having its other edge adapted to be supported on the other side of said trough, means securing said feed retainer to said cover for movement therewith but also for floating support on feed in said trough when said cover is in its closed position, and an auxiliary feed trough pivotally secured to said trough on the outer surface of each side thereof and normally being positioned against the outer surface of each side immediately below the upper edge thereof, said auxiliary trough each having relatively elongate end support arms provided thereon which engage with said trough and provide pivotal movement of said auxiliary trough up over the upper edges of said trough sides to empty said auxiliary troughs into said trough, said support arms for said auxiliary trough adjacent the pivotal edge of said cover having slots formed therein to permit such trough to be swung outwardly and upwardly of the feeder farther than the other said trough to insure dumping the contents thereof into said elongate trough through said cover.

3. In a poultry feeder, a substantially rectangular trough for the receipt of feed particles, a wire-type cover pivotally secured at one side edge to said trough, an open mesh feed retainer positioned in the said trough and supported on any feed therein, a plurality of wire hanger arms secured to said feed retainer and extending upwardly therefrom, and a plurality of support plates secured to said cover and extending downwardly therefrom, said support plates each having a vertically extending slot formed therein with a lock extension being provided at the upper end of each slot, said support plates each having a substantially horizontally extending flange thereon below the seat therein with a slot being formed in each of said flanges, each of said hanger arms being engaged with the two slots formed in one of said hanger plates for limiting the position of said hanger arms.

4. A poultry feeder as in claim 1 wherein said means comprise at least one hanger arm secured to said feed retainer and extending upwardly therefrom, and a support plate secured to said cover and slidably receiving and engaging with said hanger arm.

5. A feeder as in claim 1 wherein said means comprise a hanger strap secured to the said trough adjacent the pivoted edge of said cover, said hanger strap being engaged with said feed retainer for relative vertical movement therebetween, and a flexible retainer cable secured between said cover adjacent the free edge thereof and said feed retainer.

6. A poultry feeder comprising an elongate trough having side portions, an open mesh feed retainer received in said trough, an open type cover having one edge thereof pivotally secured to one side edge of said trough and having its other edge adapted to be supported on the other side of said trough, means securing said feed retainer to said cover for movement therewith but also for floating support on feed in said trough when said cover is in its closed position, and an auxiliary feed trough pivotally secured to said trough on the outer surface of each side thereof and normally being positioned against the outer surface of each side immediately below the upper edge thereof, said auxiliary troughs each having relatively elongate and support arms provided thereon which engage with said trough and provide pivotal movement of said auxiliary troughs up over the upper edges of said trough sides to empty said auxiliary troughs into said trough.

7. In a poultry feeder, a trough for the receipt of feed particles, a wire-type cover pivotally secured at one side edge to said trough, an open mesh feed retainer positioned in the said trough and supported on any feed therein, a hanger arm secured to said feed retainer and extending upwardly therefrom, a support plate secured to said cover, said support plate having a vertically extending slot formed therein, and means securing said hanger arm to said slot for controlled vertical movement in the said trough.

MAURICE L. MOYER.

References Cited in the file of this patent

UNITED STATES PATENTS

| Number | Name | Date |
|---|---|---|
| 1,359,808 | Jacobus | Nov. 23, 1920 |
| 1,922,435 | Harris | Aug. 14, 1933 |
| 2,003,318 | Thomsen | June 4, 1935 |
| 2,092,848 | Kermode | Sept. 14, 1937 |
| 2,221,013 | White | Nov. 12, 1940 |
| 2,278,281 | Plante | Mar. 31, 1942 |
| 2,321,877 | Troyer | June 15, 1943 |
| 2,361,598 | Calhoon | Oct. 31, 1944 |
| 2,433,912 | Keagle | Jan. 6, 1948 |